US008832215B2

(12) United States Patent
Patel

(10) Patent No.: US 8,832,215 B2
(45) Date of Patent: Sep. 9, 2014

(54) LOAD-BALANCING IN REPLICATION ENGINE OF DIRECTORY SERVER

(75) Inventor: Virag S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 675 days.

(21) Appl. No.: 12/629,530

(22) Filed: Dec. 2, 2009

(65) Prior Publication Data

US 2011/0131288 A1    Jun. 2, 2011

(51) Int. Cl.
G06F 15/16 (2006.01)
G06F 15/173 (2006.01)
G06F 9/50 (2006.01)
H04L 29/08 (2006.01)

(52) U.S. Cl.
CPC ............ G06F 9/505 (2013.01); H04L 67/1036 (2013.01); H04L 67/1002 (2013.01); H04L 67/1019 (2013.01)
USPC ........................... 709/208; 709/226; 709/201

(58) Field of Classification Search
CPC ..................... H04L 61/1523; H04L 29/08261; H04L 29/0827; H04L 67/1029; G06F 11/3433
USPC ........................................................ 709/208
See application file for complete search history.

(56) References Cited

U.S. PATENT DOCUMENTS

| 6,253,326 | B1 * | 6/2001 | Lincke et al. ................... 726/12 |
| 6,476,830 | B1 * | 11/2002 | Farmer et al. .................. 715/769 |
| 6,539,381 | B1 | 3/2003 | Prasad et al. ............ G06F 17/30 |
| 6,785,713 | B1 * | 8/2004 | Freeman et al. ............... 709/208 |
| 6,973,463 | B2 | 12/2005 | Merrells et al. .......... H04L 29/06 |
| 7,023,840 | B2 * | 4/2006 | Golla et al. ..................... 370/360 |
| 7,058,717 | B2 * | 6/2006 | Chao et al. ...................... 709/226 |
| 7,093,002 | B2 * | 8/2006 | Wolff et al. ..................... 709/219 |
| 7,181,578 | B1 | 2/2007 | Guha |
| 7,370,064 | B2 * | 5/2008 | Yousefi'zadeh ...................... 1/1 |
| 7,676,561 | B1 * | 3/2010 | Rai et al. ......................... 709/223 |
| 7,865,596 | B2 * | 1/2011 | Grosner et al. ............... 709/226 |
| 7,984,259 | B1 | 7/2011 | English |
| 2002/0176431 | A1 * | 11/2002 | Golla et al. ..................... 370/412 |
| 2003/0172145 | A1 * | 9/2003 | Nguyen ......................... 709/223 |

(Continued)

FOREIGN PATENT DOCUMENTS

EP    0955761    5/2004    ............. H04L 29/12

OTHER PUBLICATIONS

Best Practices Guide for Sun Java System Directory Server, Marina Sum et al., Sun Developer Network, Sun Microsystems, http://developers.sun.com/identity/reference/techart/bestpractices.html, http://web.archive.org/web/20071014012428/http://developers.sun.com/identity/reference/techart/bestpractices.html).

(Continued)

Primary Examiner — Brian P Whipple
Assistant Examiner — James Edwards
(74) Attorney, Agent, or Firm — Brevetto Law Group

(57) ABSTRACT

An embodiment of this invention provides a new LDAP server control to automate load balancing for replication based directory infrastructure. This solution is applicable to both master-master and master-replica based replication topologies. If one or more of the replication servers or the master servers are available for processing, the request is assigned to them based on output of a weighted non-uniform random number generator. This LDAP server control allows gaining very high performance while doing multiple parallel heavy LDAP operations. This LDAP control prevents the exposure of the replication directory server details to the outer world and therefore proves helpful in easing the security concerns.

20 Claims, 5 Drawing Sheets

(56) References Cited

U.S. PATENT DOCUMENTS

| | | | |
|---|---|---|---|
| 2003/0233328 A1* | 12/2003 | Scott et al. | 705/50 |
| 2004/0019680 A1* | 1/2004 | Chao et al. | 709/226 |
| 2004/0199485 A1* | 10/2004 | Caswell | 707/1 |
| 2008/0052341 A1* | 2/2008 | Goggin | 709/201 |
| 2008/0282162 A1* | 11/2008 | Lincke et al. | 715/710 |
| 2009/0063505 A1 | 3/2009 | Kinder | G06F 17/30 |
| 2009/0150357 A1* | 6/2009 | Iizuka | 707/3 |
| 2010/0115133 A1 | 5/2010 | Joshi | |
| 2010/0217793 A1 | 8/2010 | Preiss | |
| 2010/0223364 A1* | 9/2010 | Wei | 709/220 |
| 2011/0016214 A1 | 1/2011 | Jackson | |
| 2011/0231899 A1 | 9/2011 | Pulier et al. | |
| 2012/0029987 A1* | 2/2012 | Kusumoto et al. | 705/14.16 |

OTHER PUBLICATIONS

Designing the Replication Process, Deployment Guide Red Hat Directory Server, Red Hat, http://www.redhat.com/docs/manuals/dir-server/deploy/7.1/rep.htm, http://www.webcitation.org/5jJcjefhW).

* cited by examiner

LOAD-BALANCING IN REPLICATION ENGINE OF DIRECTORY SERVER

TRADEMARKS

IBM® is a registered trademark of International Business Machines Corporation, Armonk, N.Y., U.S.A. Other names used herein may be registered trademarks, trademarks or product names of International Business Machines Corporation or other companies. Microsoft® and Windows® is a registered trademark of Microsoft Corporation.

BACKGROUND

In computer networks, with perhaps the exception of very small ones, directory data needs to be present in more than one location to be equally useful to all users. Therefore, the directory data are replicated and the active directory service maintains several replicas of the directory data on multiple domain controllers to ensure a more uniform degree of availability and performance for all users.

On the other hand, in a computer structure, in order to achieve optimal resource utilization and higher overall performance, work is often spread between two or more resources. A dedicated program or a hardware device is usually responsible for this load balancing.

SUMMARY OF INVENTION

In one embodiment, automatic load-balancing in a plurality of directory servers is provided. The selection of the replication server groups and the master server groups is based on their Internet protocol addresses. If one or more of the replication servers or the master servers are available for processing, the request is assigned to them based on output of a weighted non-uniform random number generator.

In case the received request is a read request, a replication server group is selected. However, in case the received request is a write request, a master server group is selected. These selection and assigning steps are repeated until the request is accepted for processing by one of the replication/master servers or until a pre-configured timeout has reached. In the latter case, the write request is queued in a master queue.

DETAILED DESCRIPTION

An embodiment of this invention is a method for providing a new LDAP server control to automate load balancing for replication based directory infrastructure. This solution is applicable to both master-master and master-replica based replication topologies.

This method for LDAP server control allows gaining very high performance while doing multiple parallel heavy LDAP operations and prevents the exposure of the replication directory server details to the outer world. This is very helpful in easing the security concerns. For the rest of the disclosure, the term "LDAP write" is used for terms such as ldapmodify, ldapadd, and ldapdelete operations; and the term "LDAP read" is used for terms such as ldapsearch operation.

In one embodiment, directory servers can be categorized into two main groups. A Master directory server is a directory server that can process LDAP read and LDAP write operations. Replica directory server is a directory server that can only process LDAP read operations. Generally replica directory servers are heavily used for backing up the data and for load balancing during heavy LDAP read operations.

Embodiment of the invention include using this LDAP server control, there is no need to expose replica directory servers detail to the outer world for load balancing. Exposing only master servers suffices. This helps increasing the security of the directory server infrastructure.

In a further embodiments all LDAP operations are distributed between different LDAP directory servers, in one embodiment, it helps in gaining very high performance while doing multiple parallel heavy LDAP operations. If the requested directory server is busy with some other LDAP operations, this control forwards the requested LDAP operation to other free directory server from replication topology. It allows one master to forward LDAP read request to other master or replica whichever is free and in the same way, allows forwarding of LDAP write request to other master directory server whichever is free.

In yet a further embodiment, no manual intervention is required for load balancing.

This LDAP server control is helpful, for example, for the following replication topologies:
Master-Replica topology
Master-Master topology
Combination of Master-Replica and master-master topology In one embodiment, master queue is a queue that contains LDAP write operations only, and is performed by master directory servers only. However, common queue is a queue that contains LDAP write or LDAP read operations, and is performed by either master or replica directory servers.

Figure 1:
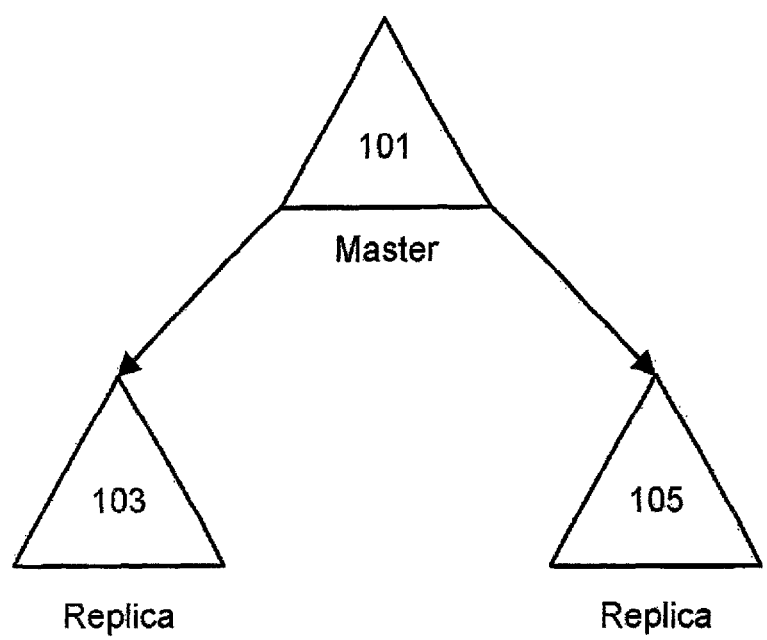
FIG. 1 is shows an exemplary topology of a master-replica replication.

FIG. 1 is an example of Master-Replica replication topology. Master 101 directory server supports replication based LDAP server control for load balancing. Replica 103 and Replica 105 are the replicas of the Master 101. The main task of this LDAP server control is to decide which directory server will process the requested LDAP operation and to forward that LDAP operation to the appropriate directory server.

In one embodiment, the LDAP server control follows the following steps:
1. LDAP write is always assigned to Master 101 because LDAP write is not allowed on Replica 103 and Replica 105. If the requested LDAP write operation to Master 101 is busy, it adds the LDAP write operation in master queue and will continuously check for the availability of the Master 101 and will assign whenever it is available to process the LDAP write operation from a master queue.
2. LDAP read is processed by any of Master 101, Replica 103 or Replica 105. If the requested LDAP read operation to any of the directory servers in topology are busy, the LDAP control first checks the availability of the Replica 103 or Replica 105. If both replicas are busy, then LDAP control checks the availability of Master 101. If all directory servers in the topology are busy, then LDAP control adds the requested LDAP read operation to a common queue, continuously checks for the availability of any directory server in the order adopted from the topology, and assigns the first server available to process LDAP read operation in the common queue.

Figure 2:
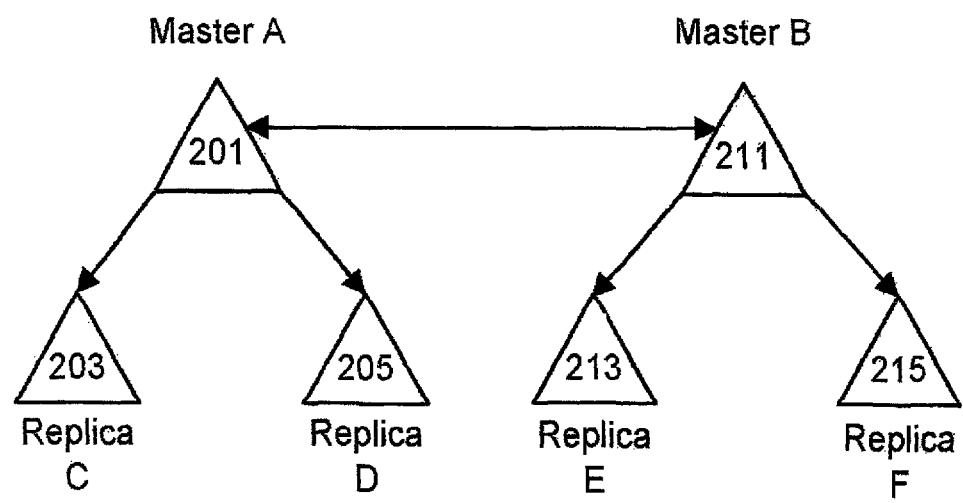
FIG. 2 is shows an exemplary the topology of a master-master replication.

FIG. 2 is an example of Master-Master replication topology. In one embodiment, Master A 201 and Master B 211 directory servers support replication based LDAP server control for load balancing. In this example, Replica C 203 and Replica D 205 are the replicas of the Master A 201 and Replica E 213 and Replica F 215 are the replicas of the Master B 211.

In this embodiment, the main task of this LDAP server control is to decide which directory server processes the requested LDAP operation and forward that LDAP operation to the appropriate directory server.

Figure 3:
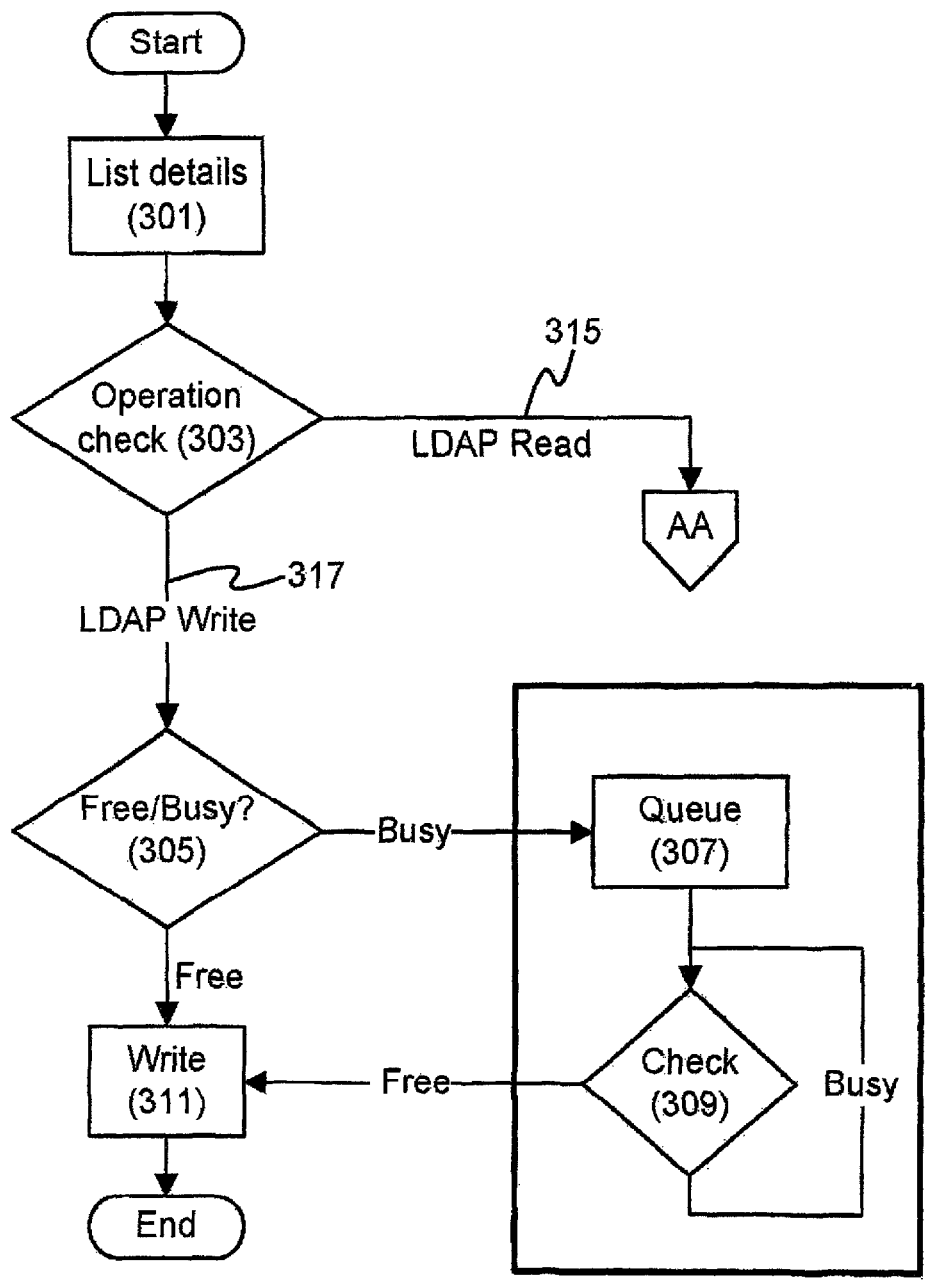
FIG. 3 illustrate an exemplary flow diagram of an embodiment of the present invention when the received request is LDAP write and LDAP read, respectively FIG. 4 illustrate an exemplary flow diagram of an embodiment of the present invention when the received request is LDAP write and LDAP read, respectively.

In one embodiment, as shown in FIG. 3, the LDAP server control starts by listing 301 all details of master and replica directory servers from the replication topology. Then the LDAP operation type is checked 303 to determine whether it is an LDAP read 315 or an LDAP write 317. As shown in FIG. 3, an example of LDAP server control follows the following steps.

First, LDAP write 317 is always assigned to Master A or Master B because LDAP write is not allowed on Replica C, Replica D, Replica E or Replica F replicas. In case Master A or Master B is free, as determined in step 305, the LDAP write operation is assigned and processed 311. In case Master A and Master B are busy, it adds the LDAP write operation to a master queue 307, continuously checks 309 for the availability of the Master A or Master B in an order indicated by the topology, such as Internet protocol, and assigns whenever it is available to process the LDAP write operation from a master queue 311.

Figure 4:
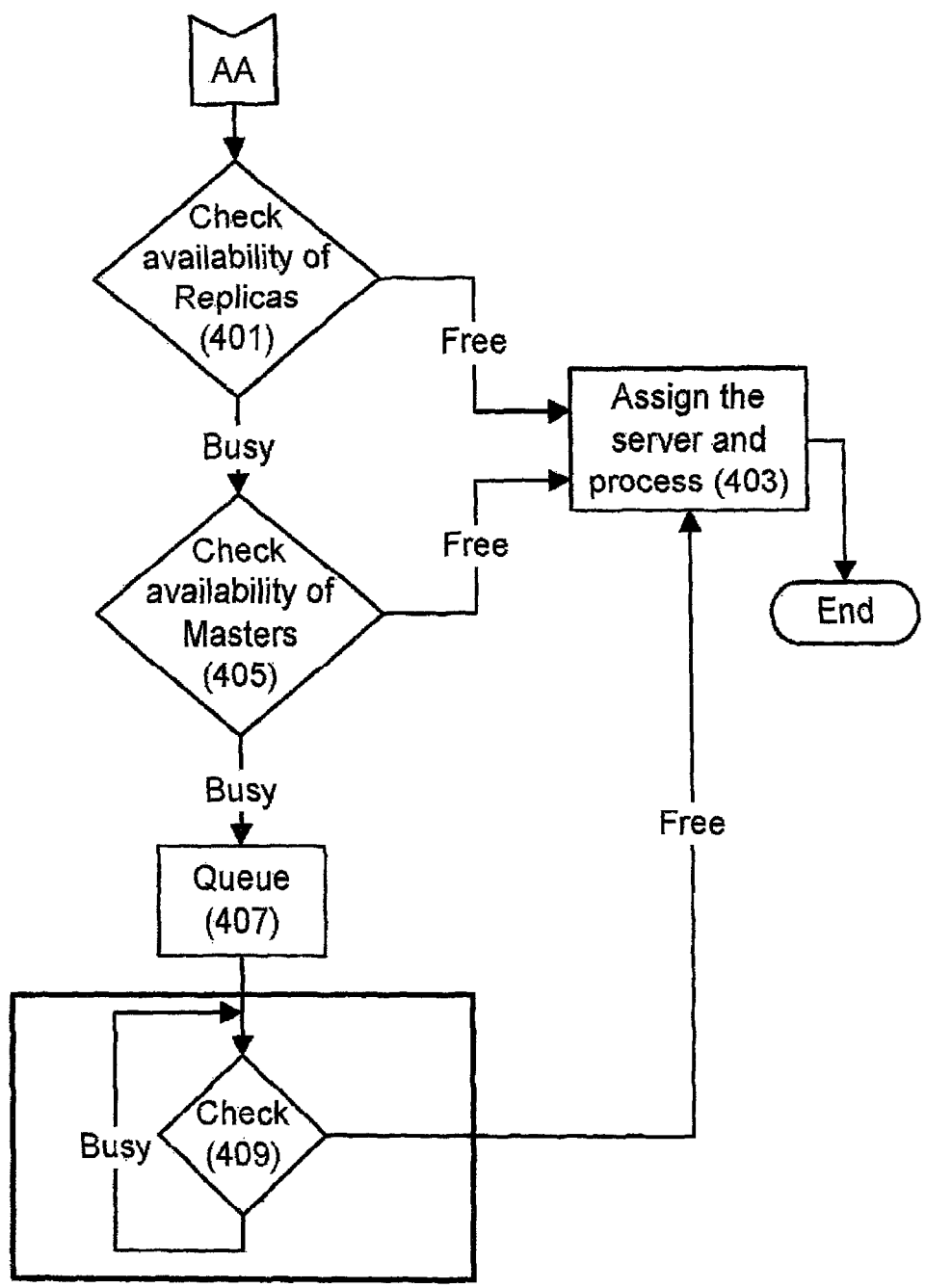

Second, LDAP read 315 (in FIG. 3) is processed by any of Master A, Replica C, Replica D, Master B, Replica E or Replica F directory servers. As shown in FIG. 4, the LDAP control first checks the availability of the Replica C, Replica D, Replica E and Replica F 401. In case all replicas are busy, then LDAP control checks the availability of Master A and Master B in order 405. If all directory servers in topology are busy then LDAP control adds the requested LDAP read operation to a common queue 407, continuously checks 409 for the availability of any directory server in an order indicated by the topology, such as Internet protocol, and assigns 403 whenever it is available to process LDAP read operation from common queue.

A method of assigning LDAP write to one of the free Master servers for load balancing, in an embodiment, is explained in the following: The Master servers are grouped into a number of Master server groups. Each Master server has an assigned weight. The source IP address of the LDAP write request is used to select the Master server groups for processing the LDAP write operation.

Then, a weighted non-uniform semi-random generator selects the available Master server for processing the LDAP write request considering the weight of the Master servers. If an available Master server is not found in the selected Master server group, then the same procedure is repeated until an available Master server is found or until a timeout threshold has reached. In case of a timeout, the LDAP write request is queued in the Master queue for future servicing.

In one embodiment, the method of assigning LDAP read to one of the free Master or replica servers for load balancing is as follows: The replica servers are grouped into a number of replica server groups. Each replica server has an assigned weight. The source IP address of the LDAP read request is used to select one of the replica server groups for processing the LDAP read operation. Then a weighted non-uniform semi-random generator selects the available replica server for processing the LDAP read request considering the weight of the replica servers.

If an available replica server is not found in the selected replica server group, then same procedure is repeated until an available Replica server is found or until a timeout threshold has reached.

In one embodiment, in case of a timeout threshold the following procedure is followed: The Master servers are grouped into a number of Master server groups. Each Master server has an assigned weight. The source IP address of the LDAP read request is used to select one of the Master servers groups for processing the LDAP read operation. Then a weighted non-uniform semi-random generator selects the available Master server for processing the LDAP read request considering the weight of the Master servers.

If an available Master server is not found in the selected Master server group, then same procedure is repeated until an available Master server is found or until a timeout threshold has reached. In case of a timeout, the LDAP read request is queued in the Common queue for future servicing.

In one embodiment, each of the directory servers from replication infrastructure is participating for the load balancing for LDAP read/write.

In one embodiment, each directory server, having the suggested replication engine of LDAP server, works as an in build load balancer. The replication engine eliminates the overhead of the proxy server or network dispatcher for automatic load balancing and as each of the directory servers participating in replication works as a load balancer, it improves the performance drastically for LDAP read/write as each directory server performs load balancing.

Conventionally, most of the replication setup supports the load balancing only through the provided load balancers and the load balancers do the distribution of the tasks. However, in this example of replication architecture, as presented in this patent application, each of the directory servers works as in build load balancers and therefore the distribution of the tasks is performed by all the directory servers participating in replication.

In one embodiment, the replication engine itself has capability to provide automatic load balancing and eliminates the use of Proxy directory server for load balancing. Replication latency is the time period for an update that occurs on one master and is replicated those updates to all replicas.

Although replication involves latency, multi-master update capability provides high availability of write access to directory objects because several servers can contain writable copies of directory objects.

In multi-master systems, several directory servers are available at all times for writing. Even though it is possible to write to all masters at the same time, this is definitely not the best idea. Every write request must be replicated, and therefore it is imperative to write only to one master at a time for the sake of consistency. Otherwise replication latency can get in the way and collision can occur. These replication conflicts should be resolved by the directory administrator by manual intervention.

In one embodiment, the introduced new method for automate load balancing for replication is very well used for the LDAP read operations. In one embodiment, it is also used for LDAP write operations, but one should consider replication latency.

None of the solutions available in current directory servers does automate load balancing for LDAP Write and LDAP Read operations for the directory servers of the replication topology. In one embodiment, the introduced method of automatic load balancing improves performance by distributing LDAP operations among other directory servers of the replication topology.

One embodiment is a method to support automate load balancing in Replication engine of the directory server. The procedure to support this method is given in the details of the disclosure. One advantage of the new replication engine is to add the capability to support load balancing automatically. Currently, there is no solution available which provides capability to support load balancing automatically.

In one embodiment, a method for automatic load-balancing in a plurality of directory servers is presented. The method comprises the following steps: A request is received at a first directory server. Each of the directory servers are configured to operate either as a master directory server or a replication directory server. The availability status of each of the directory servers is detected. It is then identified whether the received request is a read request or a write request. Then the replication directory servers and the master directory servers are grouped to replication server groups and master server groups, respectively.

In case the received request is a read request, a replication server group is selected based on source Internet protocol address of the read request. If one or more of the replication servers belonging to the first replication server group, are available for processing the read request, the read request is assigned to it, based on output of a weighted non-uniform random number generator.

The selection and the assigning steps are repeated until the read request is accepted for processing by one of the replication servers or until a configured timeout has reached. If the configured timeout has reached, a master server group is again selected based on source Internet protocol address of the read request.

If one or more of the master servers, which belong to the first master server group, are available for processing the read request, the read request is assigned to one of the master servers that is available and belongs to the master server group. This is done using output of a weighted non-uniform random number generator.

The latter selection and assigning steps are repeated until the read request is accepted for processing by one of the master servers or until a previously configured timeout has reached. If the configured timeout has reached, it enters the read request into a common queue.

In case the received request is a write request, another master server group is selected, based on source Internet protocol address of the write request. If one or more of the master servers are available for processing, the write request is then assigned to the master server using output of a third weighted non-uniform random generator.

These selection and assigning steps are repeated until the write request is accepted for processing by one of the master servers or until a pre-configured timeout has reached. In the latter case, the write request is queued in a master queue.

A system, an apparatus, a device, or an article of manufacture comprising one of the following items is an example of the invention: master directory servers, replication directory servers, read requests, write requests, Internet protocol addresses, random number generators, timeouts, thresholds, Lightweight Directory Access Protocols (LDAP), servers, controls, masters, replicas, directory infrastructures, computers, computer networks, connections, replication topologies, Internet protocols, master queues, common queues, generators, groups, proxy servers, network dispatchers, latency, collision, or replicating engines, applying the method mentioned above, for the purpose of the current invention or automated load-balancing in replication engine of directory server. Any variations of the above teaching are also intended to be covered by this disclosure.

Figure 5:
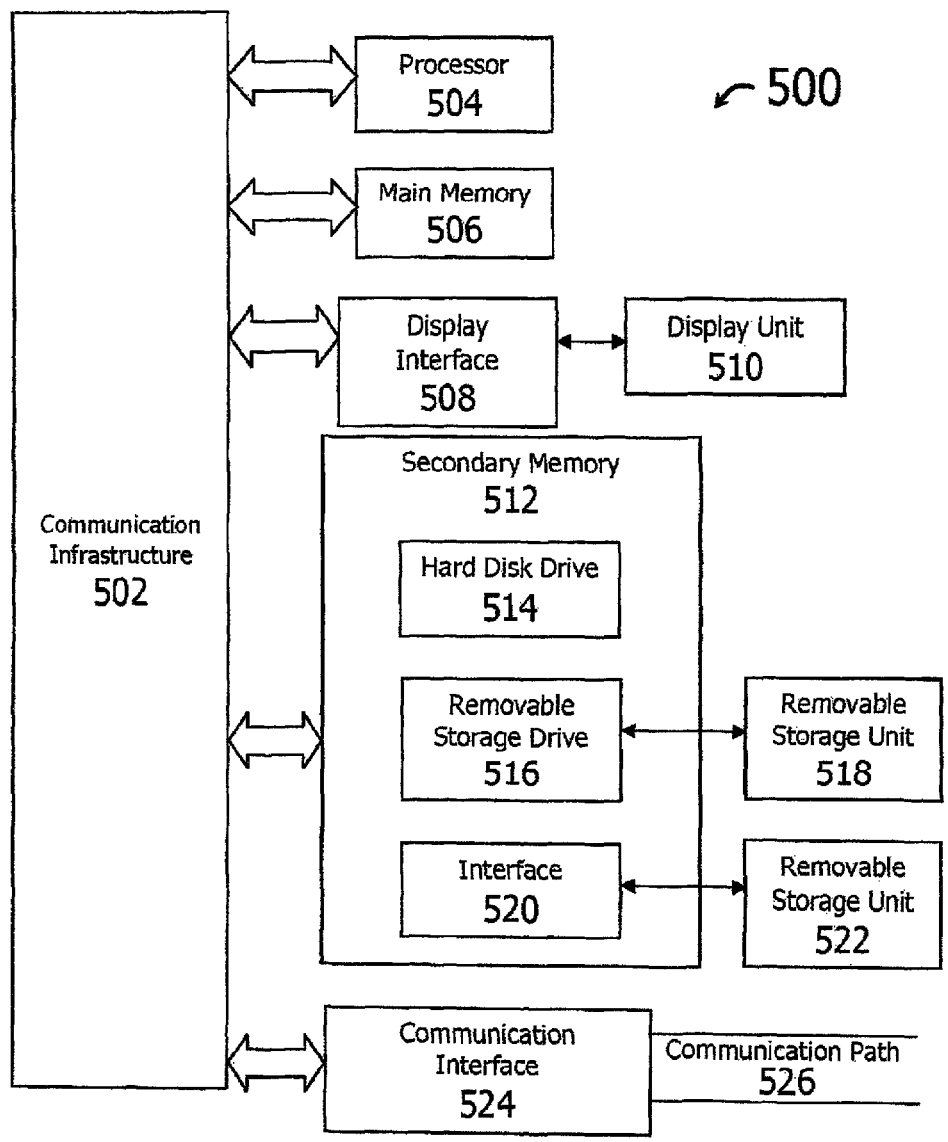
FIG. 5 illustrates an exemplary embodiment of a data processing system on which the topology and flow diagrams of FIGS. 1 to 4 may be implemented.

FIG. 5 illustrates a block diagram of an exemplary data processing system 500, for example a computing system such as a desktop computer, laptop computer, PDA, mobile phone and the likes, that can be used for implementing exemplary embodiments of the invention described in FIGS. 1 to 4. Data processing system 500 includes one or more processors, for example processor 504 as illustrated in FIG. 5. Processor 504 is coupled to a communication infrastructure 502 (for example, a communications bus, cross-over bar, or network). Various software embodiments are described in terms of this exemplary data processing system. After reading this description, it will become apparent to a person of ordinary skill in the relevant art(s) how to implement the invention using other data processing systems and/or computer architectures.

Exemplary data processing system 500 can include display interface 508 that forwards graphics, text, and other data from the communication infrastructure 502 (or from a frame buffer not shown) for display on display unit 510. Data processing system 500 also includes main memory 506, which can be random access memory (RAM), and may also include secondary memory 512. Secondary memory 512 may include, for example, hard disk drive 514 and/or removable storage drive 516, representing a floppy disk drive, a magnetic tape drive, an optical disk drive, etc. Removable storage drive 516 reads from and/or writes to removable storage unit 518 in a manner well known to those having ordinary skill in the art. Removable storage unit 518, represents, for example, a floppy disk, magnetic tape, optical disk, etc. which is read by and written to by removable storage drive 516. As will be appreciated, removable storage unit 518 includes a computer usable storage medium having stored therein computer software and/or data.

In exemplary embodiments, secondary memory 512 may include other similar means for allowing computer programs or other instructions to be loaded into the computer system. Such means may include, for example, removable storage unit 522 and interface 520. Examples of such may include a program cartridge and cartridge interface, such as that found in video game devices, a removable memory chip, such as an EPROM, or PROM and associated socket, and other removable storage units 522 and interfaces 520 which allow software and data to be transferred from removable storage unit 522 to data processing system 500.

Data processing system 500 may also include a communications interface 524. Communications interface 524 allows software and data to be transferred between the data processing system and any other external devices. Examples of communications interface 524 may include a modem, a network interface, such as an Ethernet card, a communications port, a PCMCIA slot and card, etc. Software and data transferred via communications interface 524 are typically in the form of signals which may be, for example, electronic, electromagnetic, optical, or other signals capable of being received by communications interface 524. These signals are provided to communications interface 524 via communications path (that is, channel) 526. Channel 526 carries signals and may be implemented using wire or cable, fiber optics, a phone line, a cellular phone link, an RF link, and/or other communications channels.

The terms "computer program medium," "computer usable medium," and "computer readable medium" are used to generally refer to media such as main memory 506 and secondary memory 512, removable storage drive 516, a hard disk installed in hard disk drive 514, and signals thereof. Computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface, including a wired network or a wireless network, which allows a computer to read such computer readable information.

Computer programs, also called computer control logic, are typically stored in main memory 506 and/or secondary memory 512. Computer programs may also be received via communications interface 524. Such computer programs, when executed, can enable the computer system to perform the features of exemplary embodiments of the invention as discussed herein. In particular, computer programs, when executed, enable processor 504 to perform the features of data processing system 500. Accordingly, such computer programs represent controllers of the data processing system.

Embodiments of the invention disclosed methods that may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Further, although process steps, method steps or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Further, some or all steps may be performed in run-time mode.

When a single element or article is described herein, it will be apparent that more than one element/article (whether or not they cooperate) may be used in place of a single element/article. Similarly, where more than one element or article is described herein (whether or not they cooperate), it will be apparent that a single element/article may be used in place of the more than one element or article. The functionality and/or the features of an element may be alternatively embodied by one or more other elements which are not explicitly described as having such functionality/features. Thus, other embodiments need not include the element itself.

Although embodiments of the invention have been described with reference to the embodiments described above, it will be evident that other embodiments may be alternatively used to achieve the same object. The scope is not limited to the embodiments described above, but can also be applied to software programs and computer program products in general. It should be noted that the above-mentioned embodiments illustrate rather than limit the invention and that those skilled in the art will be able to design alternative embodiments without departing from the scope of the appended claims. In the claims, any reference signs should not limit the scope of the claim. Embodiments of the invention can be implemented by means of hardware comprising several distinct elements.

What is claimed is:

1. A computer product for automatic load-balancing in a plurality of directory servers comprising a master server and one or more replication servers, the computer product comprising a non-transitory computer readable medium, upon which is stored computer readable information that, upon being executed on one or more computers, causes steps comprising:

receiving a request for the plurality of directory servers, wherein the plurality of directory servers are Lightweight Directory Access Protocols (LDAP) servers and the request is an LDAP request;

identifying the received request to be a read request;

conducting a first availability check to determine whether the plurality of directory servers are available or busy;

determining, from the first availability check, that the one or more replication servers are busy; and assigning the read request to the master server if the master server is determined to be available, or else conducting a second availability check if the master server is determined to be busy, wherein an automatic load-balancing policy seeks to assign the read request to an available one of the one or more replica servers, if any, before seeking to assign the read request to the master server.

2. The computer product of claim 1, further comprising:
adding the read request to a common queue prior to conducting the second availability check if the master server is determined to be busy.

3. The computer product of claim 2, further comprising:
assigning the read request to a first one to be identified as available among the master server and the one or more replication servers in response to the read request being added to the common queue.

4. The computer product of claim 1, wherein the master server is determined to be busy from the first availability check.

5. The computer product of claim 1, wherein the first availability check determines availability status of each of the plurality of directory servers.

6. The computer product of claim 1, further comprising:
determining whether the request is a read request or a write request.

7. The computer product of claim 6, further comprising:
in response to determining the request to be a read request, conducting the first availability check to determine availability status of each of the plurality of directory servers.

8. The computer product of claim 1, wherein the master server and the one or more replication servers are configured in a master-replica topology, the steps further comprising:
receiving a write request; and
assigning the write request to the master server.

9. A computer product for automatic load-balancing in a plurality of directory servers comprising a plurality of master servers and a plurality of replication servers, the computer product comprising a non-transitory computer readable medium, upon which is stored computer readable information that, upon being executed on one or more computers, causes steps comprising:
receiving a request for the plurality of directory servers, wherein the plurality of directory servers are Lightweight Directory Access Protocols (LDAP) servers and the request is an LDAP request;
identifying the received request to be a read request;
conducting a first availability check to determine whether the plurality of directory servers are available or busy;
determining, from the first availability check, that the plurality of replication servers are busy; and
assigning the read request to one of the plurality of master servers if at least one of the plurality of master servers is determined to be available, or else conducting a second availability check if all of the plurality of master servers are determined to be busy, wherein an automatic load-balancing policy seeks to assign the read request to an available one of the one or more replica servers, if any, before seeking to assign the read request to the master server.

10. The computer product of claim 9, further comprising:
adding the read request to a common queue prior to conducting the second availability check.

11. The computer product of claim 10, further comprising:
assigning the read request to a first one to be identified as available among the plurality of master servers and the plurality of replication servers in response to the read request being added to the common queue.

12. The computer product of claim 9, wherein the plurality of master servers are determined to be busy from the first availability check.

13. The computer product of claim 9, wherein the first availability check determines availability status of each of the plurality of directory servers.

14. The computer product of claim 9, further comprising:
determining whether the request is a read request or a write request.

15. The computer product of claim 14, further comprising:
in response to determining the request to be a read request, conducting the first availability check to determine availability status of each of the plurality of directory servers.

16. The computer product of claim 9, wherein at least one master server among the plurality if master servers and at least one replication server among the plurality of replication servers are configured in a master-replica topology, the steps further comprising:
receiving a write request; and
assigning the write request to one of the plurality of master servers.

17. A system configured for automatic load-balancing comprising:
a plurality of master servers among a plurality of directory servers;
a plurality of replication servers among the plurality of directory servers, wherein the plurality of directory servers are Lightweight Directory Access Protocols (LDAP) servers and the request is an LDAP request; and
means for load balancing configured to receive a read request for the plurality of directory servers, determine from a first availability check that the plurality of replication servers are busy, and assign the read request to one of the plurality of master servers if at least one of the plurality of master servers is determined to be available, or else conduct a second availability check if all of the plurality of master servers are determined to be busy, wherein an automatic load-balancing policy seeks to assign the read request to an available one of the one or more replica servers, if any, before seeking to assign the read request to the master server.

18. The system of claim 17, wherein the means for load balancing is further configured to add the read request to a common queue prior to conducting the second availability check, and assign the read request to a first one to be identified as available among the plurality of master servers and the plurality of replication servers in response to the read request being added to the common queue.

19. The system of claim 17, wherein the means for load balancing is further configured to conducting the first availability check to determine availability status of each of the plurality of directory servers in response to determining that a received request is the read request.

20. The system of claim 17, wherein upon a write request being received for the plurality of directory servers the means for load balancing is further configured to assign the write request to one of the plurality of master servers.

* * * * *